United States Patent Office

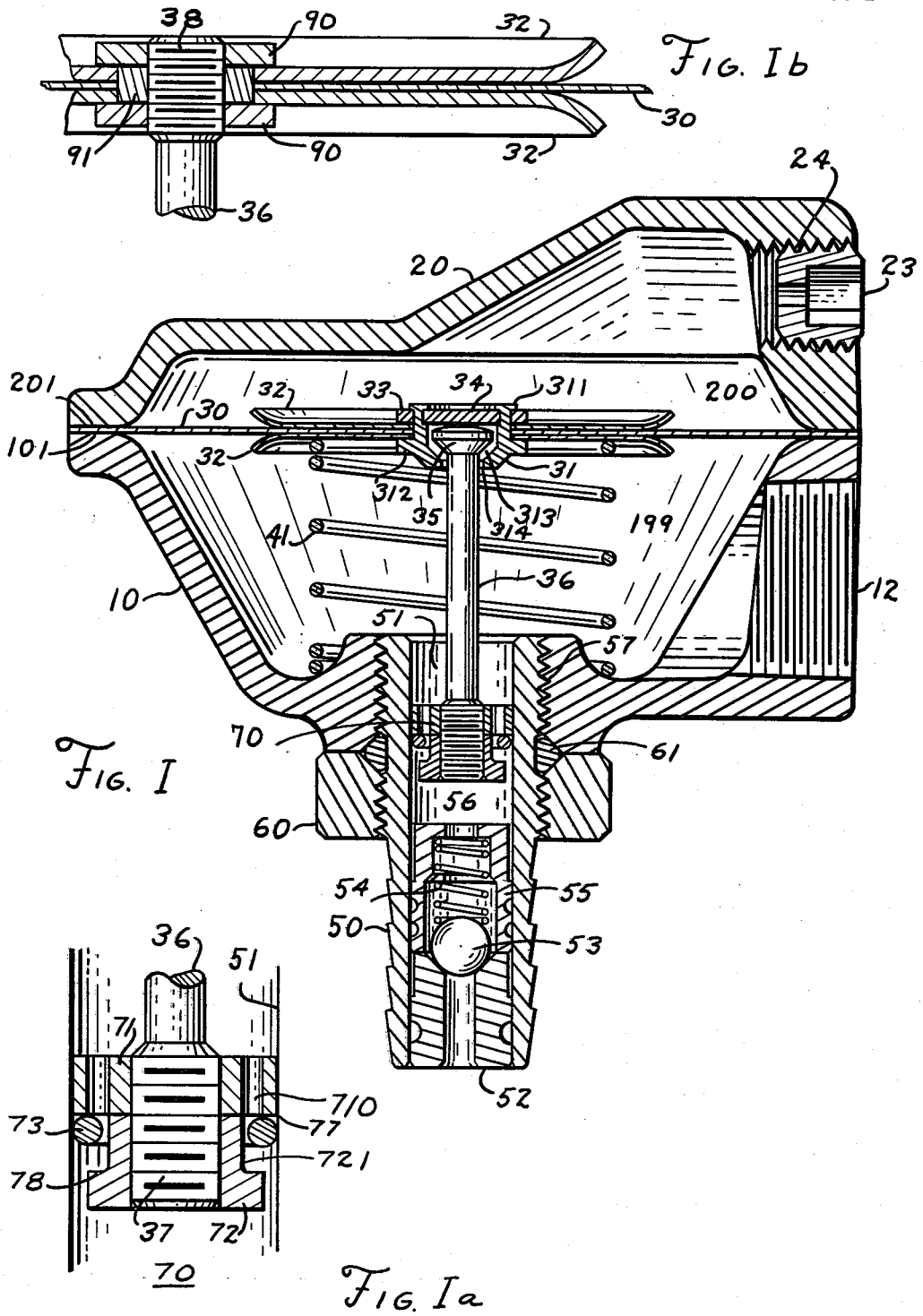

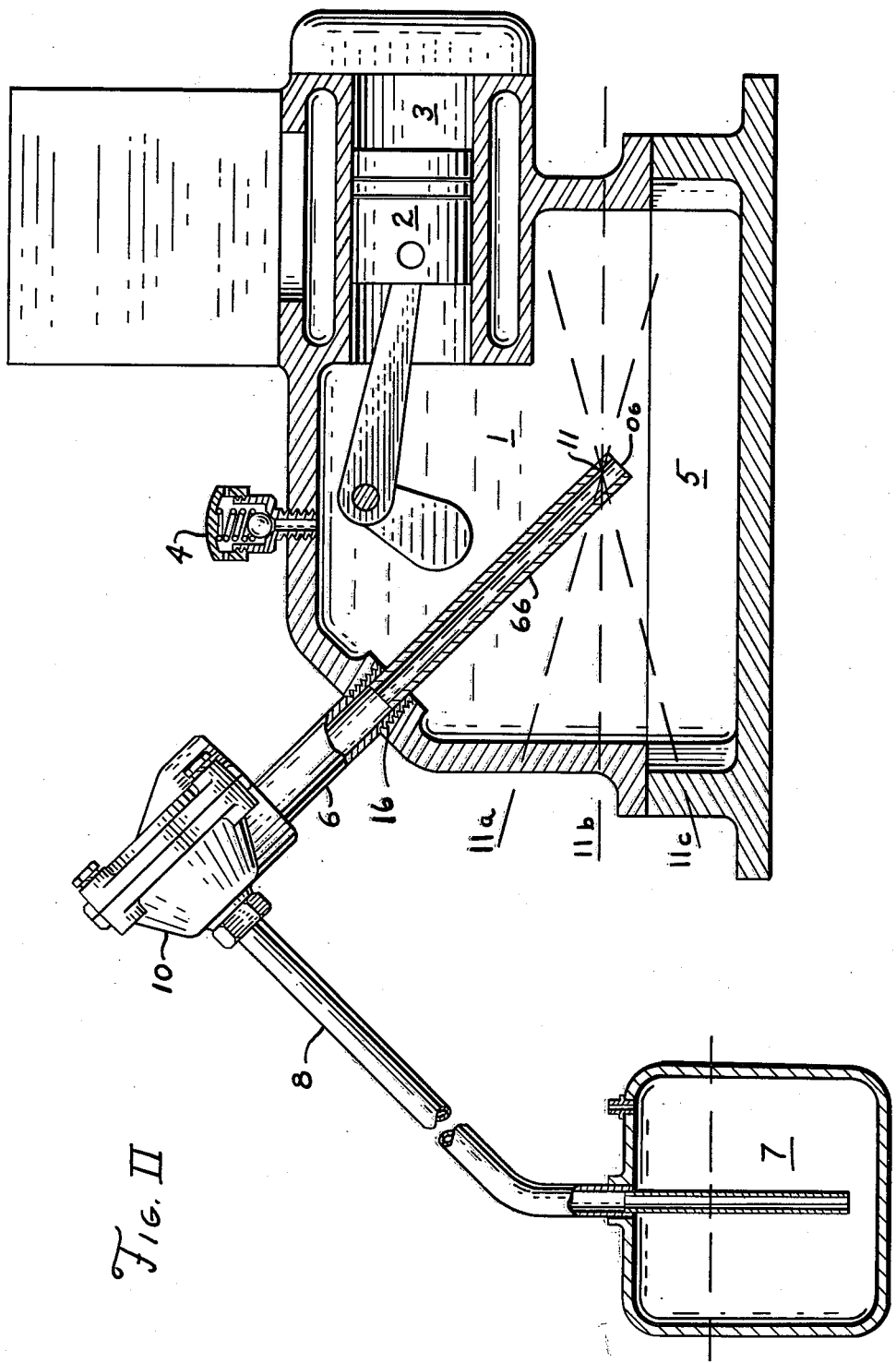

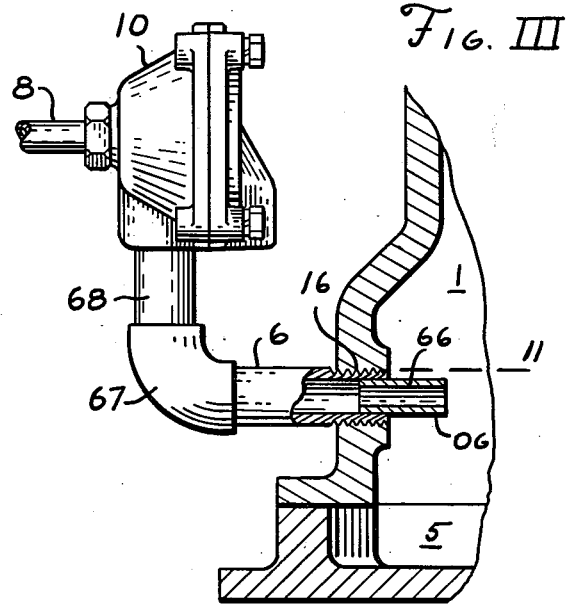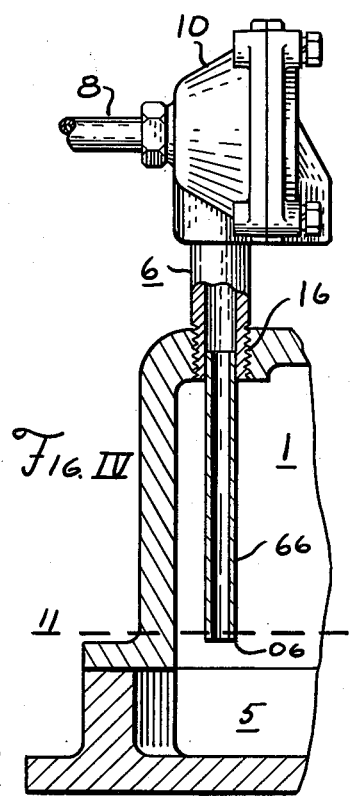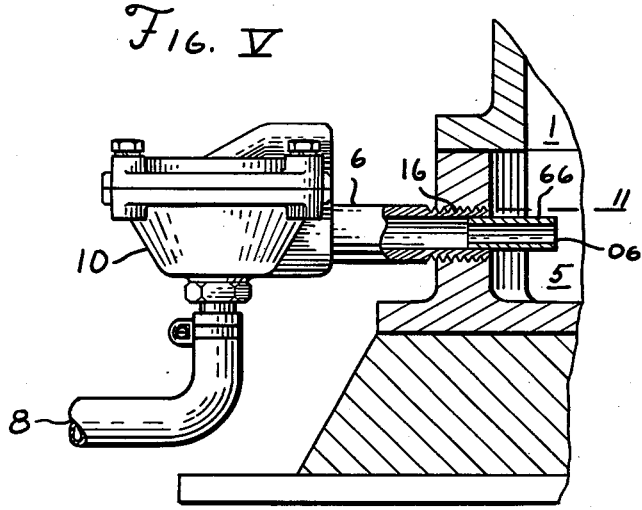

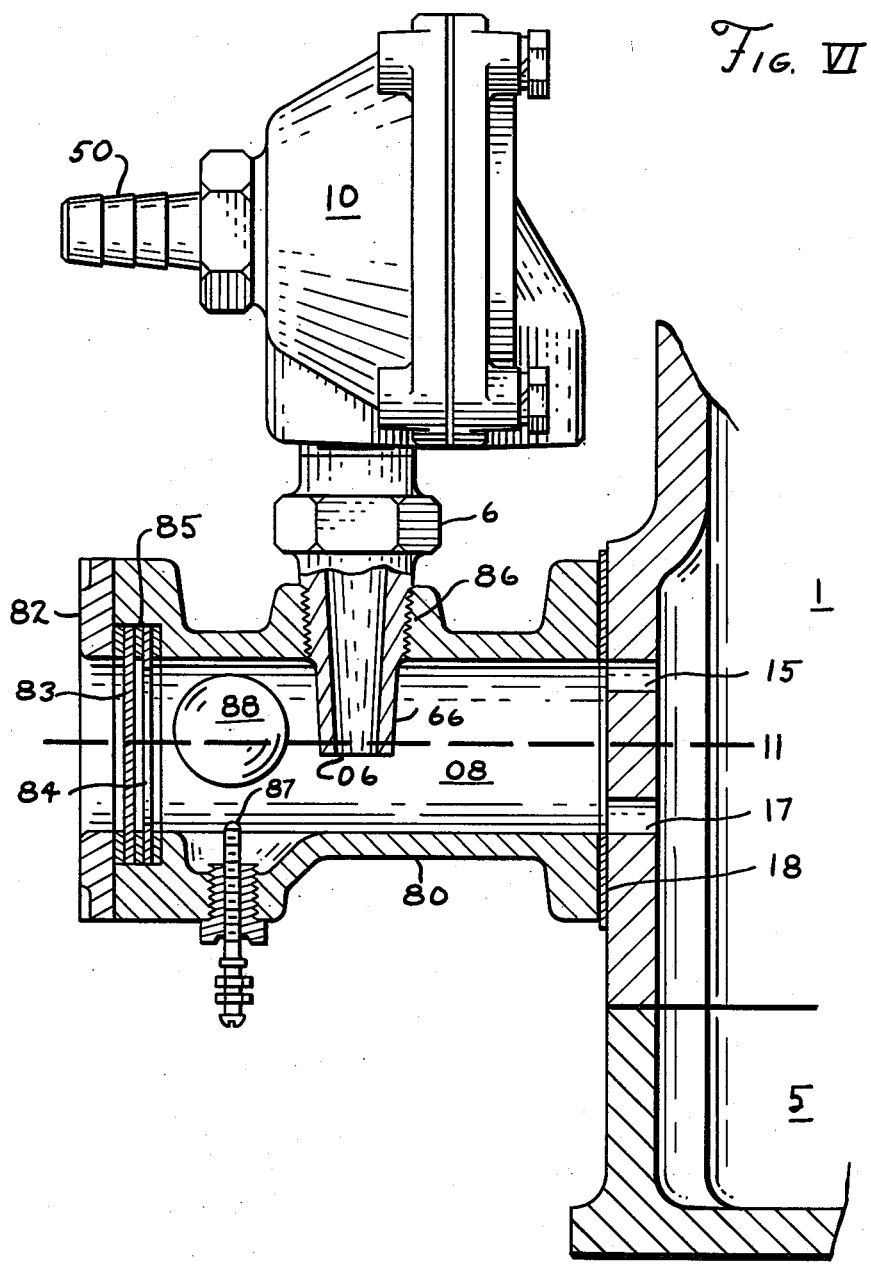

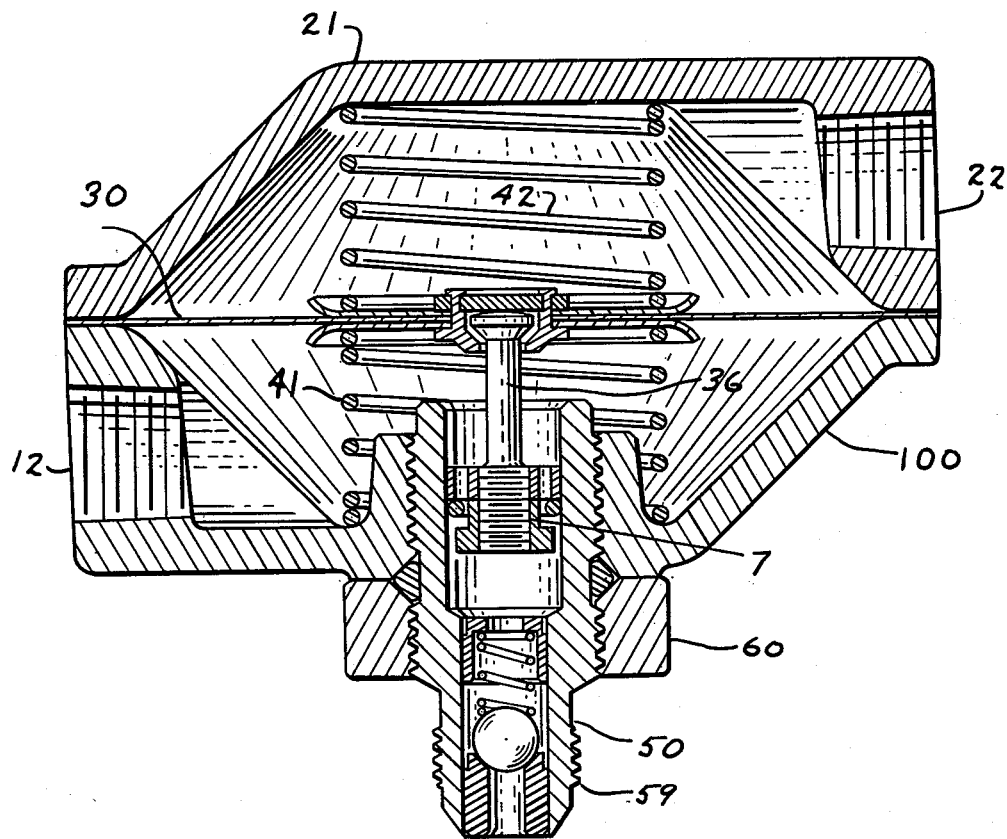
Fig VII

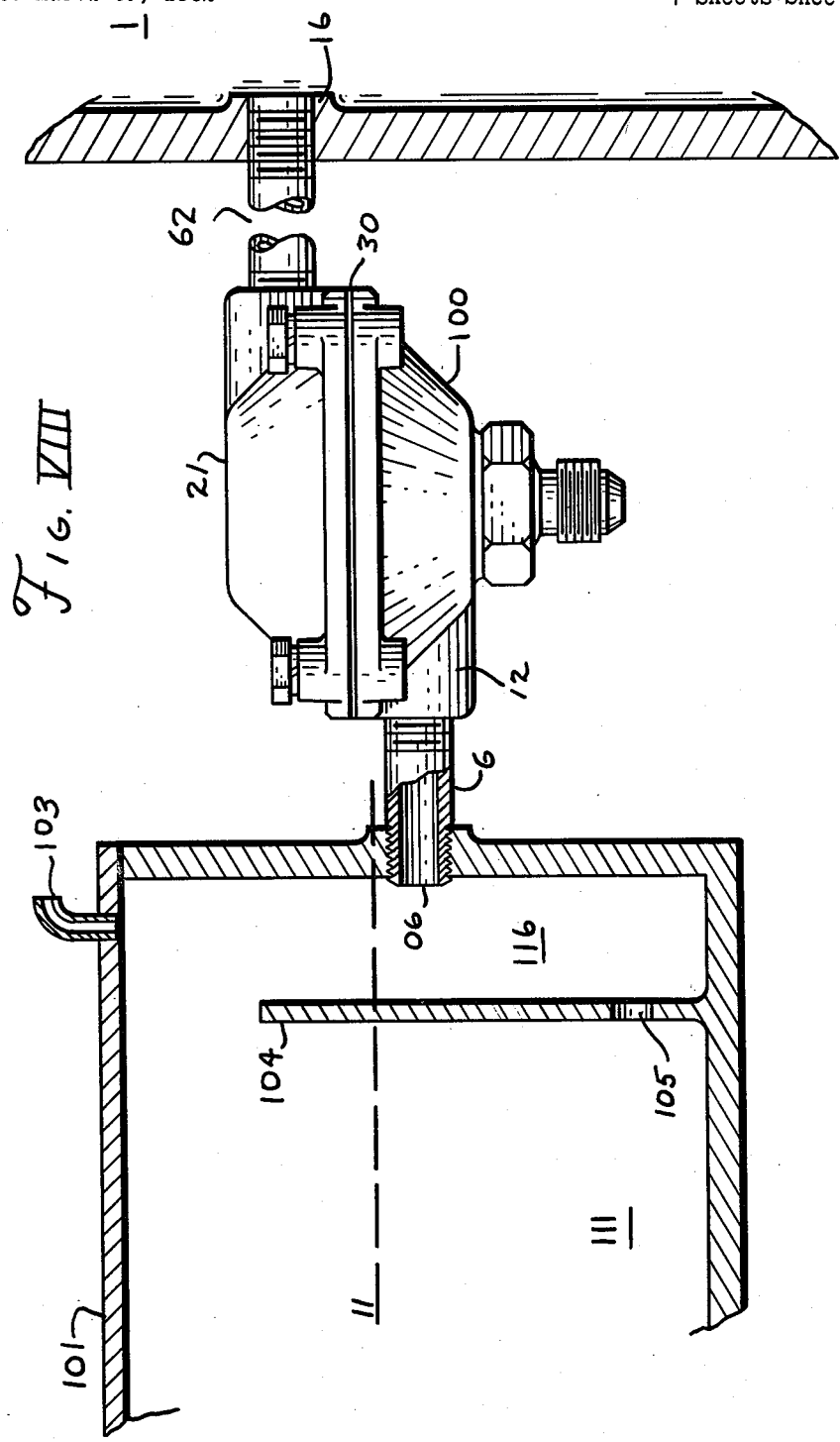

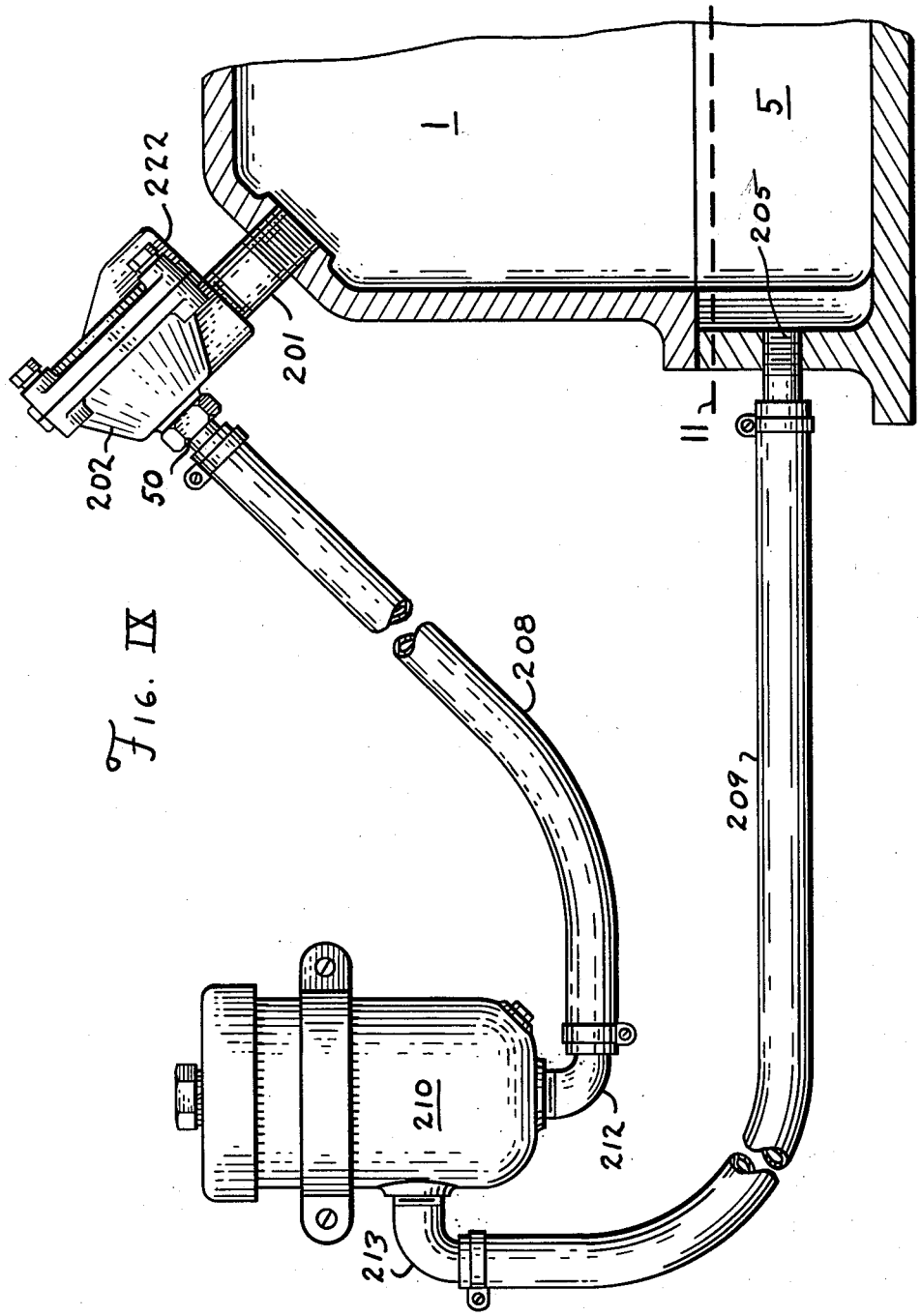

3,134,332
Patented May 26, 1964

3,134,332
PUMP AND LIQUID LEVEL REGULATOR
Robert E. Nelson, Rte. 1, Box 215, Willow Springs, Calif.
Filed Mar. 19, 1962, Ser. No. 180,669
10 Claims. (Cl. 103—22)

This invention relates to the employment of pulsating forces or pressures for the pumping or transfer of fluids and has for an object the pumping of liquid to a desired level, which may involve a controlled replenishment. It is broadly applicable in combination with any suitable source of pulsating pressure or force, such as the crankcase of a single-cylinder engine or compressor.

My pumping means employs preferably, but not necessarily, as the element driven by the source of pulsating pressure, a diaphragm which drives a light connecting rod and piston. The reciprocating system is of low mass and responsive to a wide range of driving frequencies, as the equipment with which the pump is to operate may determine.

For controlling liquid levels my invention uses a duct connecting one side of the diaphragm, when a diaphragm is used as a pumping element, with the chamber in which liquid level is to be maintained, and terminating within that chamber at a point normally just below the surface of the liquid. When submergence is complete, pumping action is prevented by the liquid which, being of substantial density, can move into and out of the end of the duct only in small volume on each pressure cycle. When the end of the duct is unsubmerged, the relatively easy movement of the air or other gas above the level of the liquid permits vigorous driving of the pump, resulting in pumping of liquid into the chamber and restoration of the liquid level.

The small movement of the liquid at the end of the duct during submergence may, in some cases, give a slight or residual pumping effect. Where this is permissible, the diaphragm and piston may be connected without looseness. In other cases no pumping action can be tolerated during submergence of the duct end. For these I provide a limited play or lost motion axially between the diaphragm and the piston, thereby allowing a small initial movement of the diaphragm without corresponding movement of the piston and therefore without pumping action. Additional freedom from initial pumping action may also be provided by the piston and ring sealing means to be described later.

In perhaps the majority of regulating applications, it is permissible and usually desirable to deliver the replenishing liquid directly to the regulating duct for transfer to the regulated chamber. For these I provide a combined piston seal and delivery valve in simple and reliable form, adapted to permit passage of delivered fluid into the space adjacent to the regulating side of the diaphragm and in communication with the regulating duct.

In some applications it is necessary to regulate the liquid level in and deliver to a chamber other than the source of pulsating pressure. For these I separate the pulsating pressure and regulating ducts, carrying them to opposite sides of the diaphragm.

As will be demonstrated, my invention as a regulator is adapted not only to stationary equipment but also to portable or mobile use with equipment which may, intermittently or for extended periods, assume various amounts of tilt with respect to the direction of gravity.

My invention serves to eliminate a common fault of float-valve types of regulators which may be gravity- or pressure-fed; their tendency to leak or seep during periods of inactivity. Since the regulator of my invention delivers by pumping and normally lifts from a source below the regulator pump, no delivery takes place except when the source of pulsating pressure is operating.

A number of very useful applications of my pressure-operated pump do not require the regulating function. For these, the termination of the duct leading from the source of pulsating pressure is above liquid and pressure interchange is unimpeded by liquid. An important example of such applications is the combination with a recirculating filter for engine crankcase lubricating oil which will be described.

Referring to the drawings, FIGURE I shows a pumping and regulating unit, an enlarged detail of the piston structure of which is shown in FIGURE I$a$. FIGURE I$b$ gives an alternative diaphragm and rod connection detail useable in some regulating and most pumping applications not requiring regulation of liquid levels. FIGURE II shows the pumping unit of FIGURE I as applied to the regulation of liquid level in the crankcase of a single cylinder engine. FIGURES III, IV, and V, show alternative detailed methods of combining my regulating pump with an engine crankcase or other point in which the level is to be regulated. FIGURE VI shows a regulating application through an antechamber. FIGURE VII shows a pumping unit designed for universal application in both regulating and simple pumping uses. FIGURE VIII shows an application of the unit of FIGURE VII in which the source of pulsating pressure is separate from the regulated point. FIGURE IX shows a pumping application in which lubricating oil in an engine or other crankcase or other container is recirculated through an oil filter.

FIGURE I shows in section the pumping unit which I use with the majority of single-cylinder engines and compressors to regulate the level of crankcase oil. This is the unit 10 of FIGURE II. The FIGURE I$a$ shows the piston and piston seal of FIGURE I enlarged. FIGURE I$b$ gives an alternative detail of the connection between the diaphragm assembly and the piston rod, used in some cases when the detail of FIGURE I is unnecessary.

In FIGURE I, the numeral 10 designates the body of the pump. Between the face 101 of this body and the face 201 of the retainer or cover 20 is a fluid displaceable element in the form of a diaphragm 30, conventionally clamped by these faces on its periphery and leaving chambers or spaces 199 and 200 at the opposite sides of the diaphragm. In this version of my pump, operating pressure is brought to the space 199 through the port 12, adapted to receive pipe or other appropriate pressure connection whereby force is applied to the diaphragm. The space 200 adjacent to the opposite side of the diaphragm is here vented to atmosphere through the drilled vent plug 23.

The axis of the pump is perpendicular to the diaphragm 30 and passes through its center. On this axis is the cylinder barrel 50, threaded into the body casting 10 at 57 and locked in place by the nut or collar 60. The O-ring seal 61 prevents leakage around the barrel. Incoming oil or other fluid is brought to the barrel by a line such as 8 in FIGURE II. The barrel 50 may be adapted to receive various types of line connection; here it is barbed to receive conventionally a hose and clamp.

Into the barrel 50 are pressed the valve seat 52 and retainer 55, normally closing the seat 52 and acting as an admission valve is the ball 53, urged against the seat by the spring 54. The retainer 55 is through-ported into the displaceable cylinder space 56, into which the piston 70 operates.

The piston 70 comprises two parts, 71 and 72, which are threaded onto the end 37 of the piston rod 36 and locked together as jamb-nuts. The outer piston part 72 is substantially smaller in diameter than the cylinder bore 51 to permit flow of fluid around it on the forward stroke from the displaceable space 56. The inner piston part 71 is carried in the bore 51 with only enough freedom or looseness to permit accommodating minor mis-alignment of the piston rod 36 without binding. The part 71 is vented by means of the holes 710, which connect with the space formed by necking down the piston part 72 over a part of its length 721. Into this space is placed the O-ring 73, which fits closely with the bore 51 but clears the smaller diameter 721 of the part 72 substantially to allow flow past the ring and through the holes 710 to pass the piston on its forward stroke. On this stroke, the ring 73 is carried forward by contact with the face 77 of the piston part 71. On the return stroke, the ring leaves this face and, after a short portion of the piston travel, comes into contact with the opposite face 78 of the part 72. Since the ring 73 is then simultaneously in contact with the bore 51 and the face 78 around its full periphery, sealing is complete, and continues thereafter throughout the return stroke. The O-ring thus not only acts as a valving element, open on the forward stroke of the piston, but as a piston seal, effective on the return stroke, as well.

During the short travel of the piston required to reverse the relative positions of the piston parts and the ring, communication exists past the piston, which tends to reduce unwanted pumping for this part of the travel of the piston.

The central area of the diaphragm 30 is clamped between the pressure plates or discs 32. Through the centers of these and of the diaphragm, the thimble 31 passes. The shoulder 312 and the ring 33 compress between them the discs and diaphragm, the edge 311 of the thimble 31 being rolled down against the ring 33. The thrust plate 34 closes the thimble center space 313, and is secured by the same rolled-down edge 311. The space 313 captures the head 35 of the piston rod 36 with some axial lost motion or play between the frusto-conical surface of the space 313 and the plate 34. The rod 36 passes out of the thimble 31 through the opening 314. Because of this lost motion between the diaphragm assembly and the piston rod, pumping cannot occur until diaphragm movement becomes substantial. This construction also gives this joint angular freedom, preventing piston side-thrust under non-axial spring loading.

For non-regulating applications and those which can tolerate small pumping rates in the nominally non-delivering condition, the joint just described may be replaced by the simpler one shown in FIGURE Ib. Here the rod end 38 is threaded to receive two nuts 90 which clamp between them the diaphragm 30 and the discs 32. The relatively soft ring or bushing 91 seals this joint and assists in locking the assembly.

The diaphragm spring 41 compensates for mean sub-atmospheric pressures such as are common in single-cylinder engines, and insures against locking up of the diaphragm assembly at one end of the potential operating travel. Low means pressures may, in some cases, permit this spring to be omitted.

The application of the pump of FIGURE I to a single-cylinder engine of conventional design is shown in diagrammatic section in FIGURE II. Pulsating pressure required to operate the pump 10 is developed in the crankcase 1 by the reciprocation of the piston 2, operating in the engine cylinder 3. Pressure peaks within the crankcase 1 may be released to atmosphere through the check-vent 4, which restricts return flow, giving ordinarily a mean pressure for the crank-case cycle which is sub-atmospheric.

Lubricating oil within the lower part of the crankcase or sump 5 stands at a level shown variously as 11a, 11b, or 11c for various possible degrees of tilt of the engine with respect to the direction of gravity. These lines intersect approximately at the point 11, which is therefore a common regulating point regardless of the attitude of the engine. The tube or duct 6, which carries the pump 10 and enters the crankcase at 16, extends to this common regulating point to terminate at the probe end O6, which is normally just below the level of the oil when the proper amount of crankcase oil is maintained. With the level 11 satisfied, the pump 10 is nearly inactive because the crankcase pulsating pressure is able to cause only little displacement into and from the probe end O6 during each pressure cycle, giving therefore only a little movement of the pump diaphragm 30. Because of the action of the pump diaphragm and piston rod joint, giving a free portion of the diaphragm stroke without pumping, no actual pumping of oil occurs at this time.

A small reduction in liquid level from that shown brings the probe end O6 near enough to the surface of the liquid to cause cavitation of the surface and some passage of crankcase gases. Since these are of relatively low density, they pass much more rapidly in volume than does the liquid, causing substantial displacement of the diaphragm. As soon as the stroke of the diaphragm begins to exceed the lost motion between the diaphragm and the piston rod, pumping may begin from the reservoir or source 7 through the line 8, causing replenishment of the oil in the crankcase through the regulating duct 6. This action continues until the probe end O6 is again fully submerged and remains so.

In normal operation and for the majority of applications of this pumping regulator, only a few occasional strokes of the pump are needed to maintain regulated level. Wear on the reciprocating elements is usually negligible, even over long service.

If, for any reason, the liquid level should become abnormally low, the probe end O6 would be fully above the level and in free communication with the gases above this level. In this case, the action of the pump becomes vigorous and continues until, with the level approaching normal, the operation becomes intermittent.

The area of the portion of the duct 6 nearest the probe end O6 is preferably chosen as just great enough to give full operation of the pump when at the low level condition and at the highest speed required of the engine. With the area so restricted, full cut-off of pumping when the level is satisfied is carried to the lowest possible frequency of pulsation or engine speed. I have found it practicable so to choose the limiting probe duct area as to permit operation at very high engine speeds with full regulation of level, without impairment of normal function at the lowest speeds at which the engine will run satisfactorily. It is desired that at least a portion of the duct be of sufficiently restrictive section to dampen substantially any pulsating movement of liquid therein whenever the termination is submerged by the liquid.

The regulating or probe duct 6 should always be so positioned as to be self-draining into the regulated chamber in order to avoid liquid blocking along its length and to insure delivery of pumped liquid to the regulated point. It is also desirable to avoid submergence of any part of the diaphragm. FIGURES III, IV and V illustrate various applications to engines in which these requirements are met.

FIGURE III shows the regulator pump 10 installed to serve the lower part of the crankcase 1 above the sump 5 in a stationary application in which the level line 11 does not tilt. The probe end O6 is placed just below the desired level line adjacent to the side of the crankcase. The lower part of the regulating duct 6 enters the crankcase at 16 and joins with the reduced-diameter probe end section 66. Connection to the regulator 10 is through the elbow 67 and nipple 68. The regulator 10 is in an accessible position with diaphragm vertical and well drained.

In FIGURE IV the pump is again placed with diaphragm vertical. The duct 6 enters the crankcase through the top at 16. The probe tip O6 ends below the level of the liquid the downward extension 66 of the duct 6.

In FIGURE V the pump is placed with diaphragm horizontal and supported by the horizontally entering duct 6, which terminates within the crankcase sump 5 in the short extension 66 and opening O6, again below the normal level of the liquid.

It will be noticed that, in the applications of FIGURES III, IV and V, the probe tip is not carried to a particular central point in the crankcase. This fact marks these as stationary applications in which the level 11 extends constantly across the engine; hence, any available position along this level serves to locate the probe end O6.

FIGURE VI shows an adaptation of the pumping regulator to an antechamber, secured to the pad 18 on the side of the crankcase 1 and given limited connection with the crankcase through the port 15, above the liquid level 11, and port 17, below it. These ports permit the level of liquid in the antechamber space O8 to be sensibly the same as in the crankcase in normal operation. The port 15 carries the gas pressure and delivery needed to transfer operating pulses from the crankcase to the chamber O8. The strength of these pulses in the chamber O8 may, if desired, be somewhat limited by limiting the size of the port 15; otherwise, this port should be adequately open. The antechamber casting 80 is closed at its outer end by the ring 82 and window 83, gasketed into the recess 85. This window permits visual observation of the operating liquid level. Optionally included is the low-level metallic float 88, which, when the level falls dangerously low, completes electrical contact between the body 80 of the antechamber and the contact electrode 87, usually connected to ground the ignition system of the engine. The float 88 is confined to its functional location by the slotted plate 84 and the probe 66.

The pump of FIGURE VI is held with diaphragm vertical by the duct-nipple 6, passing downward through the threaded boss 86 to terminate in the reduced-area section 66 and probe opening O6. This application, as those of FIGURES III, IV and V, is primarily for stationary engines, since it depends for accuracy of regulated level on the line 11 remaining normally the same across the engine.

FIGURE VII shows a pump-regulator unit adapted to a wide variety of uses, including those so far shown. Parts are numbered to conform to the notation so far used, where applicable. In addition to the spring 41 on the pump side of the diaphragm 30, I make provision for the spring 42 on the opposite side. Depending on the pressure requirements of the particular application, either or both of these springs may be omitted or removed. When both are used, they should be of such rate as to give a position within the limits of stroke of the assembly at which the average pressures of operation are balanced, thus insuring a workable point of departure for at least a part of the total possible stroke.

When used in the applications so far shown, the unit of FIGURE VII will normally be vented at 22 to atmosphere; the vent plug 23 of FIGURE I may be placed at 22 if desired.

FIGURE VIII shows an application of the unit in FIGURE VII in which the source of pulsating pressure is separate from the point to be served. In this figure, 1 is a source of pulsating pressure such as the upper part of an engine crankcase, as already shown in previous figures. This connects through duct 62 to the outer or cover part 21 of the pump-regulator unit 100, allowing the pulsating pressure to be applied to the diaphragm 30. The opposite or pump side of the diaphragm connects through port 12 and regulating duct 6 into the chamber 116, terminating at end O6. The regulated level is 11. The chamber 116 may connect to another chamber 111 through the communicating port 105 in barrier 104, the space above this barrier being common to both chambers and vented to atmosphere at 103, thereby making the level 11 common to both. This double chamber construction prevents frothing in 116 from passing into 111.

In the application of FIGURE VIII, the blocking action of liquid in the end of the regulating probe is similar to that already explained, except that, instead of preventing substantially access of operating pressure or displacement to the diaphragm through this probe, the present unit allows full access of operating pressure to the diaphragm on its opposite side and then inhibits action by preventing the required venting through the regulating probe. This unit tends to develop more basic stroke than that of FIGURE I and needs a greater degree of lost motion between the piston rod 36 and the diaphragm assembly than does that of FIGURE I, wherever it is necessary that delivery entirely cease when the level 11 is satisfied.

The application shown, although generally indicated, corresponds to the employment of my regulating pump with a single-cylinder engine having the required crankcase pressure characteristic and equipped with a pumping lubricator of conventional type, the reservoir of which could be the case 101. In these, the prevention of access of frothing liquid to the pumping elements is important and the employment of anti-frothing means such as the barrier 104 desirable.

All of the pumping regulators shown are capable of lifting liquid from a source lower than the pumping unit; such placing of the supply reservoir is preferred, since this placement prevents pumping or leakage of liquid past the regulator when the equipment is shut down, a common failing of gravity-fed float-type regulators. The height of the reservoir may vary considerably, although it is considered good practice to limit the required lift well within the maximum potential of the pump, which, in units now in service, is about 15 feet at sea level atmospheric pressure. It is noted that in FIGURES II, III, IV, V, VI, and VIII the duct is disposed in an attitude which lies in a range from one in which the termination of the duct is located vertically below the position where the duct which receives the fluid displacement, that is, the liquid from the housing of the pumping unit, to one in which the termination is located approximately at the same horizontal level as the position of receipt of the fluid from the housing; and furthermore, in each of these figures the termination is located substantially at the normal level of the liquid in the container whose liquid level is being regulated. By reason of disposing the duct within such a range of attitudes, the liquid being pumped into the duct by the pumping unit readily flows or trickles from the pumping unit and out through the termination of the duct to the reservoir being regulated even while air in the reservoir is moving in and out of the duct.

Pumping applications not requiring level regulation may be performed by the unit of FIGURE I or that of FIGURE VII, preferably using the diaphragm-rod connection of FIGURE Ib. An important application is that of FIGURE IX, in which the crankcase 1 of a single-cylinder engine supplies pulsating pressure which, delivered through the connecting duct 201 from the upper part of the crankcase to the pump 202, activates the pump diaphragm whenever the engine is in operation. Oil stands in the engine at the level 11 above the outlet 205 in the sump 5 which leads to the connecting duct 209, here shown as a flexible line leading to the inlet 213 of the conventional oil filter 210. Oil leaving the filter at its outlet 212 passes through the delivery line 208 to the inlet 50 of the pump 202. From the pump the oil returns to the engine through the duct 201 and falls back to the body of the liquid.

This system is also functional with crankcases or other reservoirs in which the required pulsating pressure is not available, if another source may be had which may be applied to the outer side of the pump diaphragm through the port 222, equivalent to the port 24 of FIGURE I or the port 22 of FIGURE VII. For example, the sump 5 of FIGURE IX could be that of a gear-case having in itself no means for the generation of the necessary pulsating pressure, which may nevertheless be at hand in associated equipment, such as a single-cylinder engine.

I claim:

1. In a system including a body of liquid, a fluid-displaceable element, a source of pulsating force adapted to urge said element in reciprocation, and means for controlling reciprocation thereof in response to the level of said liquid, comprising a duct adapted to receive fluid displacement of said element and having a termination at a point in said system in communication with said liquid and which may or may not be submerged by said liquid according to the level of the liquid surface in said system, the end of said duct at its termination becoming filled with the liquid whenever the termination is submerged in the liquid, thereby substantially damping any pulsating movement of liquid in the duct whenever the termination is submerged in the liquid.

2. In combination in a system according to claim 1, a source of liquid, a pumping element in communication with said source to receive liquid therefrom and driveably connected with said fluid-displaceable element, and means for delivering the output of said pumping element to said body of liquid, said duct being disposed in an attitude which lies in the range from one in which the termination is located vertically below the position of receipt of the fluid displacement to one in which the termination is located approximately at the same horizontal level as the position of receipt of the fluid, and said termination being located substantially at the normal level of said liquid.

3. In combination in a system according to claim 1, a source of liquid, a pumping element in communication with said source to receive liquid therefrom and driveably connected with said fluid-displaceable element, and means for delivering the output of said pumping element to said duct, said duct being disposed in an attitude which lies in the range from one in which the termination is located vertically below the position of receipt of the fluid displacement to one in which the termination is located approximately at the same horizontal level as the position of receipt of the fluid, and said termination being located substantially at the normal level of said liquid.

4. In a system including a body of liquid, a fluid-displaceable motor element, a source of pulsating fluid pressure adapted to urge said motor element in reciprocation, and means for controlling reciprocation thereof in response to the level of said liquid, comprising a duct adapted to receive fluid displacement of said motor element and having a termination at a point in said system in combination with said liquid and which may or may not be submerged by said liquid according to the level of the liquid surface in said system, the end of said duct at its termination becoming filled with the liquid whenever the termination is submerged in the liquid, thereby substantially damping any pulsating movement of liquid in the duct whenever the termination is thus submerged.

5. In combination in a system according to claim 4, a source of liquid, a pumping element in communication with said source to receive liquid therefrom and driveably connected with said fluid-displaceable motor element, and means for delivering the output of said pumping element to said body of liquid, said duct being disposed in an attitude which lies in the range from one in which the termination is located vertically below the position of receipt of the fluid displacement to one in which the termination is located approximately at the same horizontal level as the position of receipt of the fluid, and said termination being located substantially at the normal level of said liquid.

6. In combination in a system according to claim 4, a source of liquid, a pumping element in communication with said source to receive liquid therefrom and driveably connected with said fluid-displaceable motor element, and means for delivering the output of said pumping element to said duct, said duct being disposed in an attitude which lies in the range from one in which the termination is located vertically below the position of receipt of the fluid displacement to one in which the termination is located approximately at the same horizontal level as the position of receipt of the fluid, and said termination being located substantially at the normal level of said liquid.

7. In a system including a container adapted to contain in a lower portion of its volume a liquid and in the upper portion a gas, means for producing a pulsating fluid pressure in such gas, a fluid-displaceable motor element adapted to be reciprocable by the application of a pulsating fluid pressure, and a duct operably connecting said motor element with said container and having a termination at a point in said container which may or may not be submerged by said liquid according to the level of the liquid surface in said system, the end of said duct at its termination becoming filled with the liquid whenever the termination is submerged in the liquid, thereby substantially damping any pulsating movement of liquid in the duct whenever the termination is thus submerged.

8. In a system according to claim 7, a source of liquid, a pumping element adapted to receive liquid therefrom driveably connected with said fluid-displaceable motor element, and means for delivering the output of said pumping element to said container, said duct being disposed in an attitude which lies in the range from one in which the termination is located vertically below the place where said duct is operatively connected with said motor element to one in which the termination is located approximately at the same horizontal level as its point of connection with the motor element, and said termination being located substantially at the normal level of said liquid.

9. In a system according to claim 7, a source of liquid, a pumping element adapted to receive liquid therefrom and driveably connected with said fluid-displaceable motor element, and means for delivering the output of said pumping element to said duct, said duct being disposed in an attitude which lies in the range from one in which the termination is located vertically below the place where said duct is operatively connected with said motor element to one in which the termination is located approximately at the same horizontal level as its point of connection with the motor element, and said termination being located substantially at the normal level of said liquid.

10. In a system including a body of liquid of potentially varying level and a pump having a pumping element controllable according to the freedom of reciprocation of a fluid-displaceable element which connects with a duct having a termination communicable with said liquid and which may or may not be submerged by said liquid according to the level of the liquid surface in said system, a reciprocable pumping element and a linkage operably connecting said pumping element with said fluid-displaceable element, means incorporating in said linkage a degree of lost motion or play smaller than the maximum possible reciprocation of said fluid-displaceable element but larger than the motion of said fluid-displaceable element when in minimum reciprocating condition, said duct being displosed in an attitude which lies in the range from one in which the termination is located vertically below the point of connection of the duct with the fluid displaceable element to one in which the termination is located approximately at the same horizontal level as its point of connection with the fluid displaceable element, and said termination being located substantially at the normal level of said liquid.

References Cited in the file of this patent

UNITED STATES PATENTS

| | | | |
|---|---|---|---|
| 166,786 | Knecht | Aug. 17, | 1875 |
| 2,067,358 | Thornton | Jan. 12, | 1937 |
| 2,095,602 | Huff | Oct. 12, | 1937 |
| 2,101,218 | Huff | Dec. 7, | 1937 |
| 2,629,328 | Ladd | Feb. 24, | 1953 |
| 2,683,060 | Wise et al. | July 6, | 1954 |
| 2,775,944 | Ryder et al. | Jan. 1, | 1957 |
| 2,781,728 | Fischer et al. | Feb. 19, | 1957 |
| 2,943,765 | Glasgow et al. | July 5, | 1960 |